US010785653B2

(12) United States Patent
Nair et al.

(10) Patent No.: US 10,785,653 B2
(45) Date of Patent: Sep. 22, 2020

(54) SECURE SHORT MESSAGE SERVICE OVER NON-ACCESS STRATUM

(71) Applicant: Nokia Technologies Oy, Espoo (FI)

(72) Inventors: Suresh Nair, Whippany, NJ (US); Anja Jerichow, Grafing (DE); Nagendra S. Bykampadi, Bangalore Karnataka (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/581,690

(22) Filed: Sep. 24, 2019

(65) Prior Publication Data

US 2020/0021992 A1    Jan. 16, 2020

Related U.S. Application Data

(63) Continuation of application No. 15/974,394, filed on May 8, 2018, now Pat. No. 10,470,042.

(51) Int. Cl.
| | |
|---|---|
| *H04W 12/10* | (2009.01) |
| *H04W 8/02* | (2009.01) |
| *H04W 12/04* | (2009.01) |
| *H04W 4/14* | (2009.01) |
| *H04W 60/00* | (2009.01) |
| *H04L 9/14* | (2006.01) |
| *H04L 29/06* | (2006.01) |
| *H04W 12/00* | (2009.01) |
| *H04W 8/18* | (2009.01) |
| *H04W 88/18* | (2009.01) |

(52) U.S. Cl.
CPC ............ *H04W 12/10* (2013.01); *H04L 9/14* (2013.01); *H04L 63/0428* (2013.01); *H04W 4/14* (2013.01); *H04W 8/02* (2013.01); *H04W 12/0017* (2019.01); *H04W 12/04* (2013.01); *H04W 12/1006* (2019.01); *H04W 60/00* (2013.01); *H04W 8/18* (2013.01); *H04W 12/0401* (2019.01); *H04W 88/184* (2013.01)

(58) Field of Classification Search
CPC ... H04W 12/04; H04W 36/04; H04W 84/045; H04W 12/02; H04W 12/10; H04W 36/0038; H04W 36/08; H04W 36/24; H04W 36/28; H04W 76/10; H04W 88/08; H04W 4/14; H04W 72/0406
See application file for complete search history.

(56) References Cited

U.S. PATENT DOCUMENTS 10,362,011 B2 *  7/2019  Lee ........................ H04L 63/08
10,506,438 B2 * 12/2019  Yilmaz ................ H04W 74/08
(Continued)

*Primary Examiner* — Liton Miah

(57) ABSTRACT

A short message service (SMS) message is encrypted using an encryption key stored at a user equipment and an access and mobility management function (AMF) and the encrypted SMS message is added to a payload of a non-access stratum (NAS) message that includes an NAS header. Integrity protection is applied to the NAS message using an integrity key stored at the user equipment and the AMF and the integrity-protected NAS message is transmitted. The NAS message is received via an NAS link between the user equipment and the AMF. An integrity check is performed on the NAS message using the integrity key. An encrypted short message service (SMS) message is extracted from a payload of the NAS message in response to the integrity check being successful and the encrypted SMS message is decrypted using the encryption key.

22 Claims, 9 Drawing Sheets

(56) References Cited

U.S. PATENT DOCUMENTS

2013/0095796 A1* 4/2013 Cho ..................... H04W 4/14
                                                    455/411
2015/0382189 A1* 12/2015 Zhang ................. H04L 63/061
                                                    380/285
2018/0007552 A1* 1/2018 Bae ...................... H04L 63/06

* cited by examiner

SECURE SHORT MESSAGE SERVICE OVER NON-ACCESS STRATUM

CROSS-REFERENCE TO RELATED APPLICATIONS

The presentation application is a continuation application of U.S. patent application Ser. No. 15/974,394, entitled "SECURE SHORT MESSAGE SERVICE OVER NON-ACCESS STRATUM" and filed on May 8, 2018 the entirety of which is incorporated by reference herein. This application claims priority to India (IN) Patent Application 201741026689, filed in India on Jul. 27, 2017, the entirety of which is incorporated by reference herein.

BACKGROUND

The non-access stratum (NAS) is a protocol layer implemented in wireless communication protocol stacks between user equipment and a core network. NAS is the highest stratum of the control plane between user equipment and a mobility management entity (MME) or an access and mobility management function (AMF) at the radio interface. The NAS layer manages the establishment of communication sessions and maintains continuous communication as the user equipment moves through the network. Examples of functions supported by the NAS protocols include mobility of the user equipment and session management procedures that are used to establish and maintain connectivity between the user equipment and a packet data network via the mobile data network. In contrast, an access stratum (AS) layer and corresponding AS protocol are used to convey information over an air interface in the wireless portion of the network. The NAS protocol is transported using radio resource control (RRC) messages in Second Generation (2G), Third Generation (3G), Fourth Generation (4G), and Fifth Generation (5G) networks that operate according to the standards defined by the Third Generation Partnership Project (3GPP).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

User equipment register for a short message service (SMS) over non-access stratum (NAS) by transmitting a request to an access and mobility management function (AMF) that forwards the request to an SMS service function (SMSF). Once registered, the user equipment can exchange secure SMS messages over one or more NAS links with the AMF by encrypting the SMS message using an encryption key (such as an NAS encryption key) and adding the encrypted SMS message to a payload of an NAS message. An NAS header is appended to the payload and integrity protection is applied to the NAS message using an integrity key (such as an NAS integrity key). The encryption key and the integrity key are part of an NAS context that is generated during registration of the user equipment with the AMF and the SMSF. The NAS context also includes addresses of the user equipment and the SMSF. In some embodiments, the user equipment and the AMF establish multiple NAS links that can be used to convey the SMS over NAS messages. The NAS links can be associated with different encryption keys and integrity keys. The NAS header in each NAS message therefore includes information identifying the NAS link. The receiving entity (the user equipment for mobile-terminated SMS and the AMF for mobile-originated SMS) uses the information identifying the NAS link to select the appropriate keys for integrity checking and decryption of the SMS message.

Figure 1:
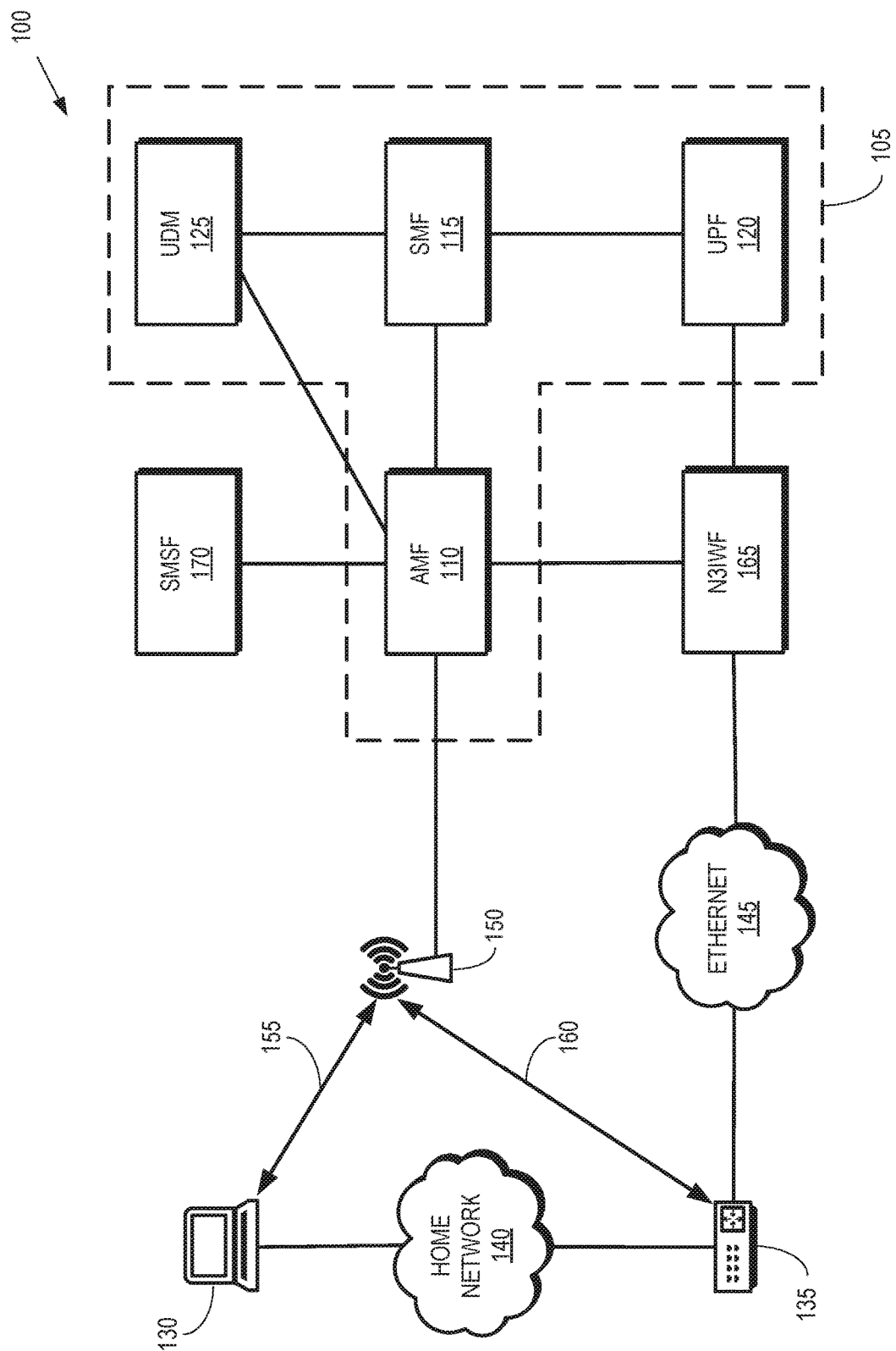
FIG. 1 is a block diagram of a first example of a communication system that supports secure short message service (SMS) messaging over NAS according to some embodiments.

FIG. 1 is a block diagram of a first example of a communication system 100 that supports secure SMS messaging over NAS according to some embodiments. The communication system 100 provides support for both mobile and fixed access. As used herein, the term "mobile access" refers to accessing a communication system (e.g., the communication system 100) over an air interface. Mobile access can therefore be referred to as wireless access, mobile communication, wireless communication, or other similar terms. The term "fixed access" refers to accessing to a communication system using a device that is physically connected to the communication system, e.g., accessing a communication system such as the communication system 100 via wires, optical fibers, and the like. Fixed access can therefore be referred to as wireline access, wired communication, or other similar terms. The communication system 100 supports hybrid access that allows devices to concurrently access the communication system 100 using mobile access and fixed access.

The communication system 100 includes a core network 105 that is accessible by either mobile or fixed devices using a common user plane access and a control plane that supports common authentication, authorization, and accounting (AAA) and policy control. The core network 105 includes an access and mobility management function (AMF) 110 that manages access control and mobility for devices in the communication system 100. The core network 105 also includes a session management function (SMF) 115 to set up and manage sessions in the communication system 100 according to network policies. An association between user equipment and the core network 105 can be represented as a packet data unit (PDU) session that can be managed by the SMF 115. The PDU session supports data connectivity between user equipment and a data network.

The core network 105 also includes one or more user plane functions (UPF) 120 that can be deployed in the communication system 100 to provide services to users of the communication system 100. The core network 105 further includes a unified data manager (UDM) 125 that processes credentials, location management, subscription management, and the like. The UDM 125 stores data including user subscription data, such as subscription identifiers, security credentials, access and mobility related subscription data, and session related subscription data. Some embodiments of the core network 105 include other functionality such as a policy control function and a network function repository function, which are not shown in FIG. 1 in the interest of clarity. Some embodiments of the core network 105 are implemented using network function virtualization and software defined networking, as discussed herein. For example, different network slices can be used to instantiate different instances of the AMF 110, the SMF 115, the UPF 120, or the UDM 125 for different users or devices. Each PDU session is part of one network slice.

In the illustrated embodiment, a device 130 has a wired connection to a residential gateway 135 via a home network 140. The term "user equipment" can be used to refer to either the device 130 or the residential gateway 135 (or a combination thereof) because both the device 130 and the residential gateway 135 can be owned or operated by the customer on the customer premises. The residential gateway 135 has a wired connection to an Ethernet network 145. Some embodiments of the wired connection use line termination devices such as a digital subscriber line access multiplexer (DSLAM) or a gigabit passive optical network (GPON). The communication system 100 can therefore provide the user equipment (e.g., the device 130 or the residential gateway 135) with fixed access to the core network 105.

The communication system 100 can also provide the user equipment with mobile access to the core network 105, e.g., via a radio access network 150 that is connected to the AMF 110 over a corresponding interface such as an N2 interface. The radio access network 150 is also connected to the UPF 120 by a corresponding interface such as an N3 interface, which is not shown in FIG. 1 in the interest of clarity. The radio access network 150 is able to provide wireless connectivity to the device 130 via a wireless connection 155. The radio access network 150 is also able to provide wireless connectivity to the residential gateway 135 via a wireless connection 160.

An interworking function 165 is disposed between the Ethernet 140 and the core network 105. The interworking function 165 can also be referred to as a non-3GPP interworking function (N3IWF). The interworking function 165 is configured to modify or translate messages conveyed from the fixed access user equipment to the core network 105 so that the fixed access user equipment appears to be accessing the core network 105 according to mobile access standards or protocols from the perspective of the core network 105. The interworking function 165 is also configured to modify or translate messages conveyed from the core network 105 to the fixed access user equipment so that the messages received by the fixed access user equipment conform to corresponding fixed access standards or protocols. The interworking function 165 supports interfaces with the AMF 110 and the UPF 120.

One or more NAS links are used to convey NAS messages between the user equipment and the AMF 110, which are the terminating endpoints of the NAS links. The device 130 (or other user equipment) can therefore communicate with the core network 105 using NAS messages that are conveyed via a first (fixed) NAS link that traverses the residential gateway 135 and the wired connection supported by the home network 140, a second (mobile) NAS link that traverses the radio access network 150 and the wireless connection 155 or other NAS links such as a Wi-Fi link or other non-3GPP link. Some embodiments of the device 130 (or other user equipment) can support multiple concurrent NAS links with the AMF 110. For example, the device 130 and the AMF 110 can concurrently support a fixed NAS link, a mobile NAS link, and a non-3GPP NAS link.

Prior to establishing an NAS link, the user equipment (such as the device 130) transmits an NAS registration message to register with the AMF 110. The NAS registration message can include information that is used to perform authorization (and, in some cases, authentication) of the user equipment. The registration message can also be used to register the user equipment with an SMS service function (SMSF) 170 for SMS messaging. Registration of the user equipment with the AMF 110 also includes generating or provisioning an encryption key and an integrity key for the user equipment and the AMF 110. The encryption key and the integrity key are used to provide secure SMS messaging over the NAS link, as discussed herein.

The SMSF 170, which can also be referred to as a short message service center (SMSC), provides a "store and forward" mechanism for conveying SMS messages. For example, the SMSF 170 can store mobile-terminated SMS messages that are addressed to the user equipment and attempt to forward the SMS messages to the user equipment. For another example, the SMSF 170 can store mobile-originated SMS messages received from the user equipment and then forward the SMS messages to the appropriate destination in an external network. The payload length of SMS messages is limited by the constraints of the signaling protocol to precisely 140 bytes or 1120 bits. The SMS messages can be encoded using a variety of alphabets: the default GSM 7-bit alphabet, the 8-bit data alphabet, and the 16-bit UCS-2 alphabet, and the like. Depending on which alphabet the user equipment using, the maximum number of characters in an SMS message can be 160 7-bit characters, 140 8-bit characters, 70 16-bit characters, or some other value.

Mobile-originated or mobile-terminated SMS messages can be securely transmitted in the wireless communication system 100 by transmitting encrypted SMS messages as payloads in NAS messages that are transmitted over NAS links between the user equipment and the AMF 110. In some embodiments, SMS messages are encrypted using the encryption key stored at the user equipment and the AMF 110. The encrypted SMS message is added to a payload of an NAS message that includes an NAS header. Integrity protection is applied to the NAS message using the integrity stored at the user equipment and the AMF 110. The integrity-protected NAS message is then transmitted, e.g., mobile-originated SMS messages are transmitted from the user equipment to the AMF 110 and mobile-terminated SMS messages are transmitted from the AMF 110 to the user equipment. The NAS message is received via an NAS link between the user equipment and the AMF 110. An integrity check is performed on the received NAS message using the integrity key. The encrypted SMS message is extracted from a payload of the NAS message in response to the integrity check being successful and the encrypted SMS message is decrypted using the encryption key.

Figure 2:
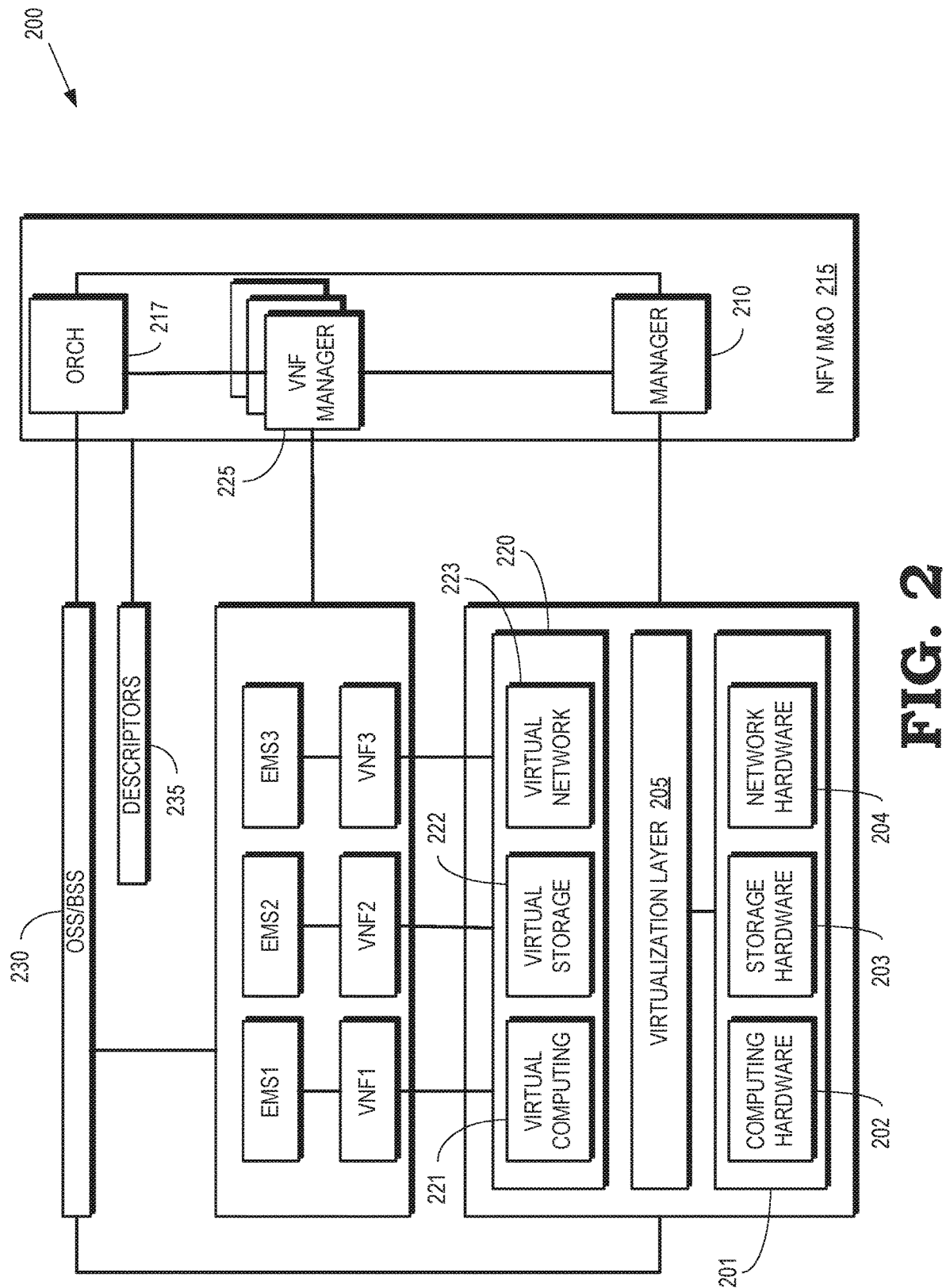
FIG. 2 is a block diagram of a network function virtualization (NFV) architecture according to some embodiments.

FIG. 2 is a block diagram of an NFV architecture 200 according to some embodiments. The NFV architecture 200 is used to implement some embodiments of the communication system 100 shown in FIG. 1. The NFV architecture 200 includes hardware resources 201 including computing hardware 202, storage hardware 203, and network hardware 204. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices that provide control plane functions, such as instances of the AMF 110, the SMF 115, the UPF 120, or the UD and 125 shown in FIG. 1. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
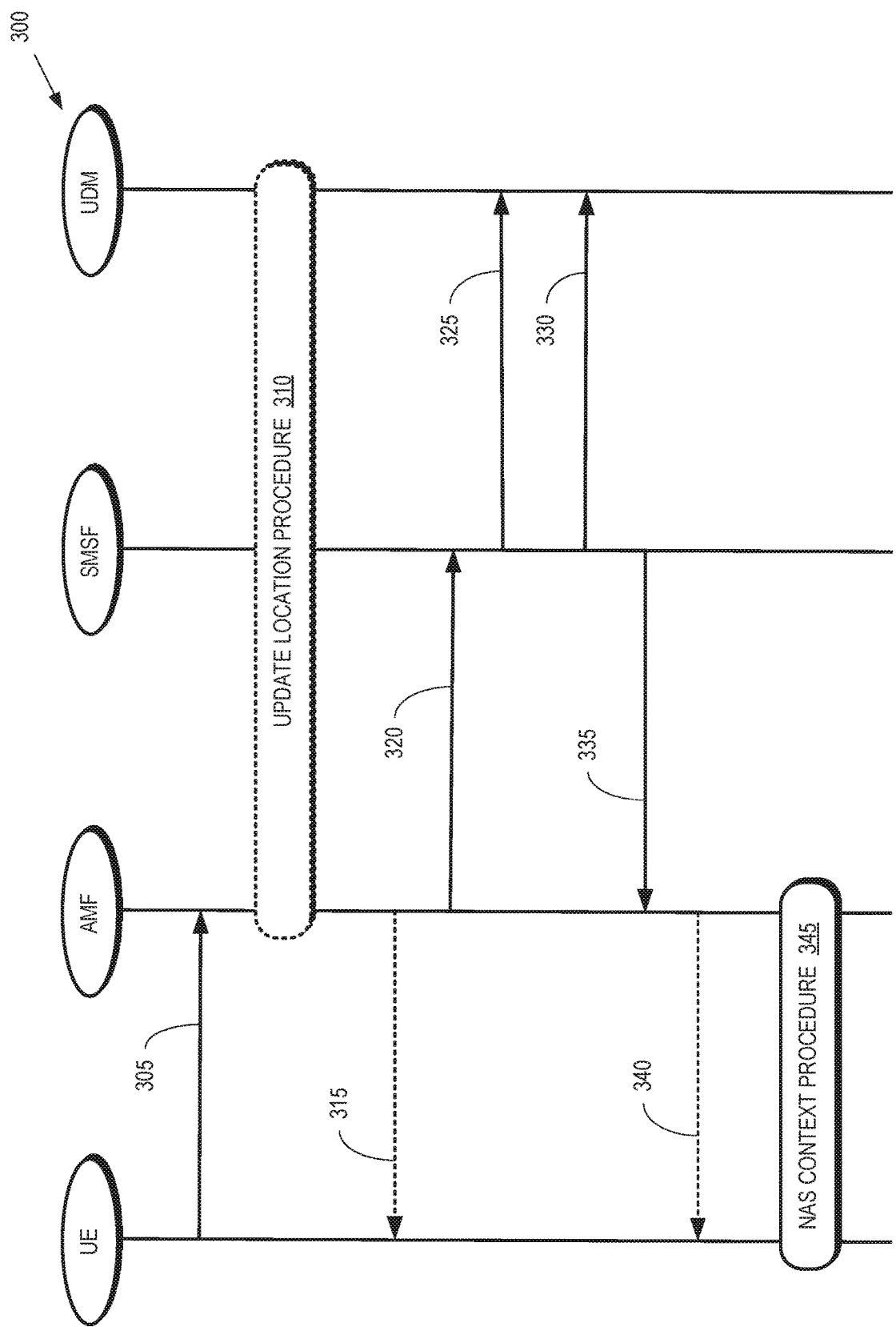
FIG. 3 illustrates a message flow that is used to register a user equipment with an AMF and an SMS service function (SMSF) for secure SMS messaging over NAS according to some embodiments.

FIG. 3 illustrates a message flow 300 that is used to register a user equipment with an AMF and an SMSF for secure SMS messaging over NAS according to some embodiments. The message flow 300 is implemented in some embodiments of the communication system 100 shown in FIG. 1.

The user equipment (UE) transmits a registration request 305 to the AMF. The registration request 305 includes information indicating that the user equipment supports SMS messaging over NAS. Some embodiments of the registration request 305 also include information indicating whether the user equipment supports SMS messaging over wired NAS links, wireless NAS links, non-3GPP links, or a combination thereof.

In response to receiving the registration request 305, the AMF can optionally perform an update location procedure 310 with a UDM in the core network. If the registration request 305 includes an indication that the user equipment supports SMS messaging over NAS, the AMF can access SMS subscription information for the user equipment from the UDM. The AMF then determines whether the user equipment is authorized for the SMS service based on the SMS subscription information. If so, the AMF can discover and select an SMSF that is used to provide the SMS service to the user equipment. Discovery of the SMSF can be performed using a preconfigured SMSF address or an address that is provided to the AMF by the UDM.

In some embodiments, the AMF provides a registration acceptance 315 in response to determining that the user equipment is authorized for SMS service and selecting the SMSF to provide the SMS service. However, some embodiments of the AMF do not transmit the registration acceptance 315 until after receiving confirmation from the SMSF, as discussed below.

The AMF transmits a service activation 320 to the SMSF using the SMSF address. The service activation 320 can include the AMF address. In response to the service activation 320, the SMSF transmits a subscriber data request 325 to the UDM, which returns the requested subscription information. The SMSF can also create a user equipment context to store the SMS subscription information and the AMF address. The SMSF transmits a context management message 330 to instruct the UDM to store the SMSF address for a short message terminating routing. The SMSF then transmits a service activation 335 to the AMF.

In some embodiments, the AMF provides a registration acceptance 340 in response to receiving a confirmation that the SMSF will provide the SMS service to the user equipment. In some embodiments, the registration acceptance 340 can also indicate whether the SMSF supports SMS messaging over wired NAS links, wireless NAS links, non-3GPP links, or a combination thereof.

The user equipment and the AMF perform an NAS context procedure 345. Although the NAS context procedure 345 is depicted as occurring after the registration acceptance 340, some or all of the NAS context procedure 345 can occur at different points within the registration process indicated by the message flow 300. The NAS context procedure 345 is used to establish an NAS context that is stored by the user equipment and the AMF. The NAS context can include an address of the user equipment, an address of the SMSF, an identifier of an NAS link, an encryption key associated with the NAS link, and an integrity key associated with the NAS link. In some embodiments, multiple NAS links can be established between the user equipment and the AMF. In that case, the NAS context can include identifiers of the multiple NAS links, as well as associated encryption and integrity keys.

Figure 4:
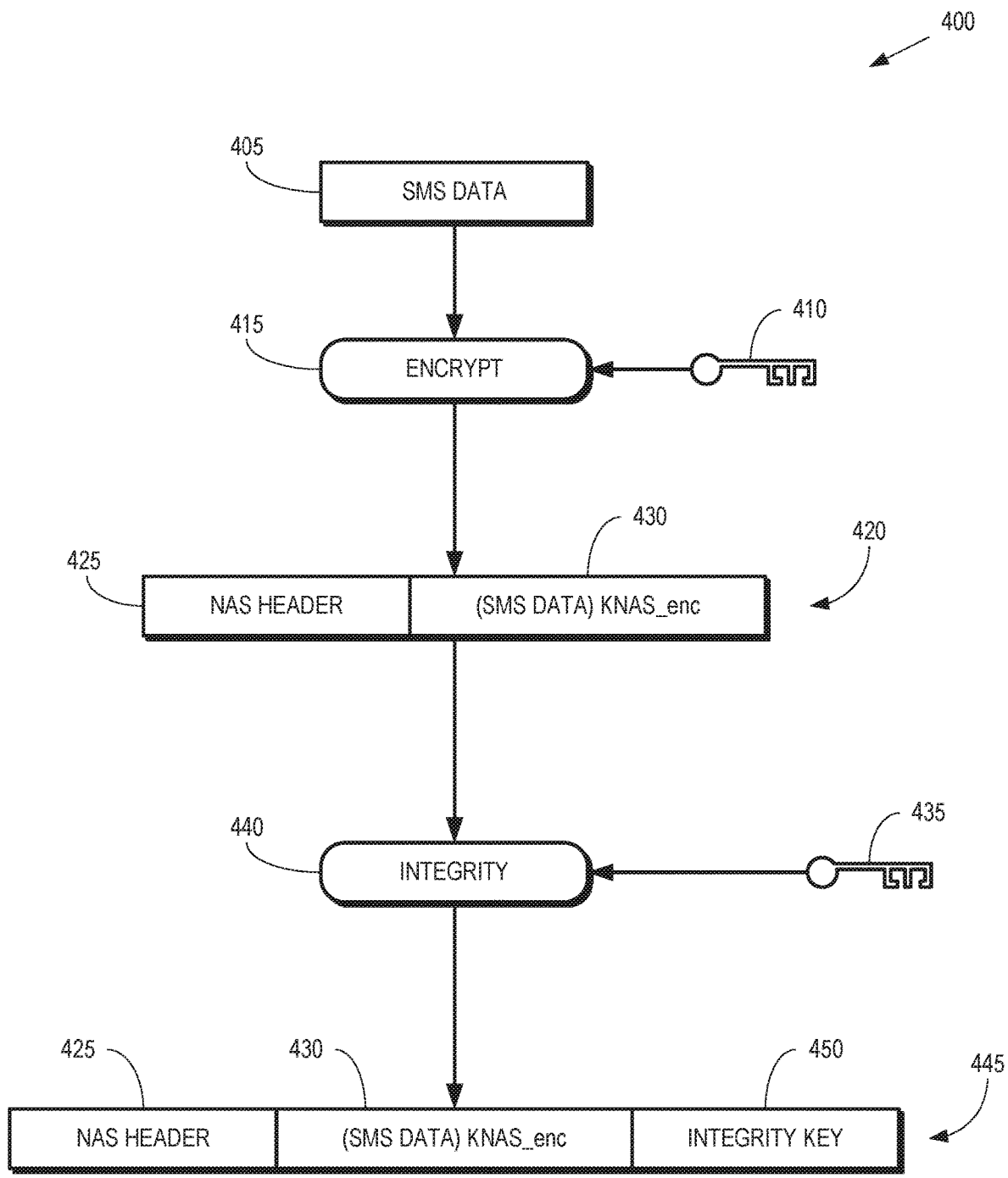
FIG. 4 illustrates a process of generating an integrity-protected NAS message that includes an encrypted SMS message according to some embodiments.

FIG. 4 illustrates a process 400 of generating an integrity-protected NAS message that includes an encrypted SMS message according to some embodiments. The process 400 is used in some embodiments of the communication system 100 shown in FIG. 1. For example, the device 130 shown in FIG. 1 can use the process 400 to generate integrity-protected NAS messages to carry encrypted mobile-originated SMS messages. For another example, the AMF 110 shown in FIG. 1 can use the process to generate integrity-protected NAS message to carry encrypted mobile-terminated SMS messages.

The process 400 is performed on SMS data 405. In the case of a mobile-originated SMS message, the SMS data 405 is generated by user equipment. In the case of a mobile-terminated SMS message, the SMS data 405 is generated by an SMSF and provided to an AMF, which performs the process 400. The SMS data 405 and an encryption key 410 are provided to an encryption module 415. The encryption key 410 is stored in an NAS context associated with the user equipment and the AMF and copies of the encryption key 410 are stored at the user equipment and the AMF. Some embodiments of the encryption key 410 are NAS encryption keys. The encryption module 415 encrypts the SMS data 405 using the encryption key 410.

An NAS message 420 is formed by adding the encrypted SMS data 425 to a payload of the NAS message and appending an NAS header 430. Some embodiments of the NAS header 430 include information identifying an NAS link that is used to convey the NAS message 420. As discussed herein, the information identifying the NAS link can be used to identify the encryption key 410 in an NAS context and an integrity key 435 that is used to provide integrity protection for the NAS message 420.

An integrity protection module 440 uses the integrity key 435 to generate an integrity-protected NAS message 445. For example, information 450 generated based on the integrity key 435 can be appended to the NAS message 422 generate the integrity-protected NAS message 445.

Figure 5:
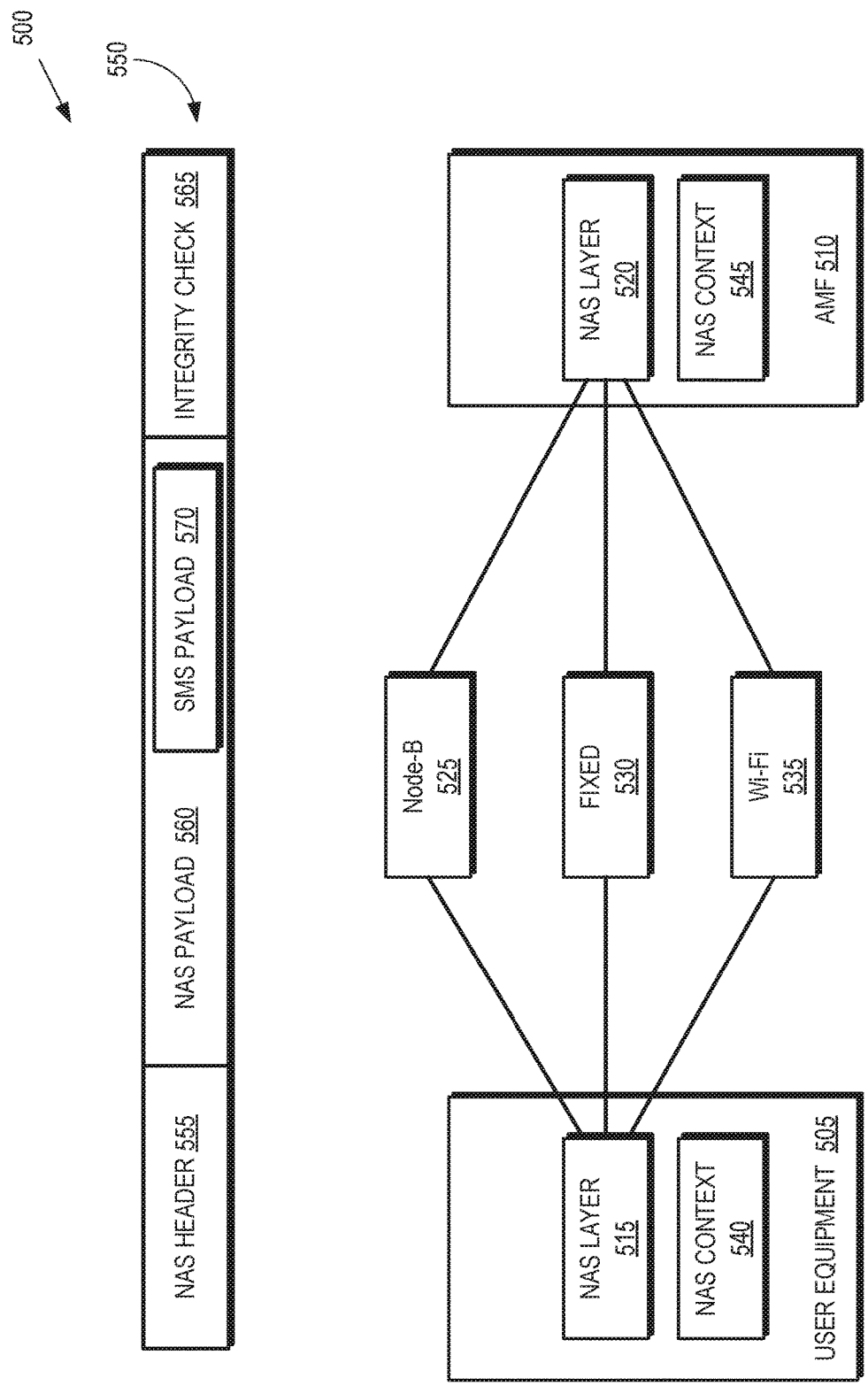
FIG. 5 is a block diagram of a communication system that supports secure SMS messaging over multiple NAS links according to some embodiments.

FIG. 5 is a block diagram of a communication system 500 that supports secure SMS messaging over multiple NAS links according to some embodiments. The communication system 500 includes user equipment 505 and an AMF 510, which are used to implement some embodiments of the user equipment and the AMF 110 shown in FIG. 1. The user equipment 505 and the AMF 510 implement NAS layers 515, 520, respectively, which are configured to establish and maintain NAS links between the user equipment 505 and the AMF 510. In the illustrated embodiment, the user equipment 505 and the AMF 510 have established multiple NAS links including a mobile NAS link that is established via a radio access network that includes a node-B 525, a fixed NAS link that is established via fixed hardware 530 that includes a wired connection to the user equipment 505, and a non-3GPP NAS link that is established via a Wi-Fi access point 535. The user equipment 505 and the AMF 510 store NAS contexts 540, 545, respectively, which include information such as addresses of the user equipment 505 and an SMSF that provides an SMS service to the user equipment 505, encryption keys for the NAS links, integrity keys for the NAS links, and the like.

An NAS message 550 can be transmitted between the NAS layers 515, 520 over a selected one of the NAS links. In some embodiments, one of the NAS links is selected by the transmitting node (either the user equipment 505 or the AMF 510) based on selection criteria such as latencies, congestion, usage costs, priorities, and the like. The NAS message 550 includes an NAS header 555, an NAS payload 560, and integrity check information 565 that is formed using an integrity key. In the illustrated embodiment, the NAS payload 560 includes an SMS payload 570, which includes an encrypted SMS message. For example, the SMS payload 570 can be formed by encrypting an SMS message using the encryption key for the NAS link that is used to convey the NAS message 550. The NAS header 555 includes information identifying the NAS link that is used to convey the NAS message 550. The receiving node can then use this information to access the context information for the NAS link used to convey the NAS message 550, e.g., the receiving node can access the correct encryption key and integrity key that are used to perform the integrity check of the NAS message 550 and decryption of the SMS payload 570.

Figure 6:
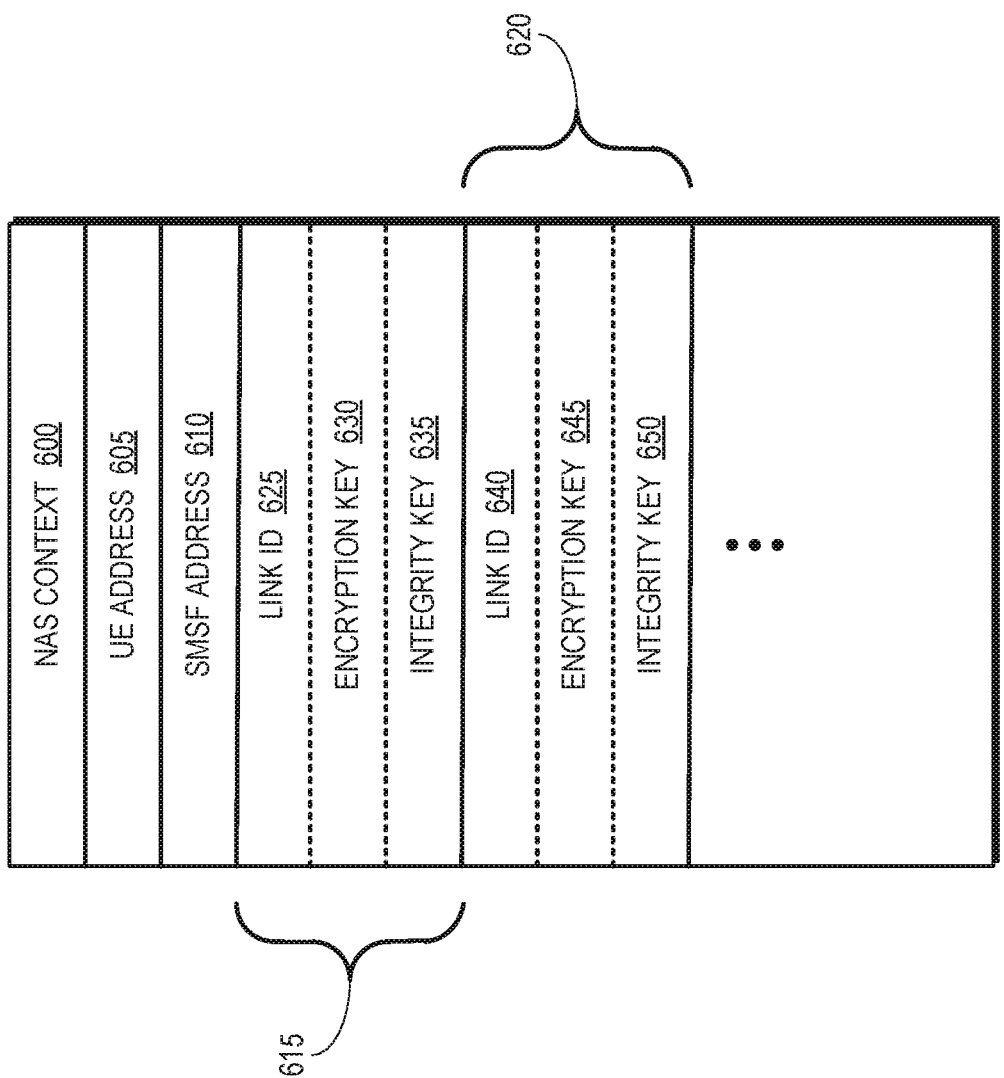
FIG. 6 is a block diagram of an NAS context according to some embodiments.

FIG. 6 is a block diagram of an NAS context 600 according to some embodiments. The NAS context 600 is used to implement some embodiments of the NAS contexts 540, 545 shown in FIG. 5. As discussed herein, the NAS context 600 can be configured during a registration process such as the registration process implemented in some embodiments of the method flows 300 shown in FIG. 3. The NAS context 600 is stored in some embodiments of the user equipment and the AMF 110 shown in FIG. 1 and in some embodiments of the user equipment 505 and the AMF 510 shown in FIG. 5.

The NAS context 600 includes an address 605 of the user equipment and an address 610 of an SMSF that provides an SMS service to the user equipment indicated by the address 605. The NAS context 600 also includes link-specific information 615, 620 that is associated with the NAS links that have been established between the user equipment and the AMF that stores the NAS context 600. For example, the link-specific information 615 includes an identifier 625 of a first NAS link between the user equipment and the AMF, an encryption key 630 that is used to encrypt or decrypt portions of the NAS messages that are transmitted over the first NAS link, and an integrity key 635 that is used perform integrity checks on the NAS messages that are transmitted over the first NAS link. For another example, the link-specific information 620 includes an identifier 640 of a second NAS link between the user equipment and the AMF, an encryption key 645 that is used to encrypt or decrypt portions of the NAS messages that are transmitted over the second NAS link, and an integrity key 650 that is used perform integrity checks on the NAS messages that are transmitted over the second NAS link.

Some embodiments of the NAS context 600 can include more or less link-specific information depending on the number of links that are concurrently established between the user equipment and the AMF. The amount of link-specific information can also increase or decrease in response to changes in the number of links that are concurrently established between the user equipment and the AMF.

Secure SMS messaging over NAS can be implemented in standardized communication systems. For example, in 3GPP Technical Specification (TS) 23.502, which is incorporated herein by reference in its entirety, an insecure SMS over NAS procedure is described in clause 4.13.3. A baseline procedure referred to as "MO SMS over NAS in CM-IDLE (baseline)" is described in clause 4.13.3.3 and another optimized procedure referred to as "MO SMS using one step approach in CM-IDLE" is described in clause 4.13.3.4. Both procedures use NAS messages as the transport to carry SMS messages between a UE and an AMF, both in the mobile-originated and mobile-terminated cases. Some embodiments of the secure SMS messaging techniques disclosed herein can be implemented in the standardized SMS over NAS solutions.

To perform secure SMS messaging over NAS, the UE first establishes an NAS context with an AMF (such as the NAS context 600 shown in FIG. 6) and then UE registers with an SMSF to send or receive SMS messages over NAS. If the UE is already registered with the SMSF and if the UE goes in to Idle mode, it is possible to send SMS messages in a one-step procedure using NAS as the transport and using NAS security to protect the SMS message. If the UE is already in Idle mode and the SMSF receives an SMS message that is addressed to the UE, the UE is paged. When the UE connects in response to the page, the SMS message can be delivered to the UE in a one-step NAS message. If the UE is not registered with the SMSF, the UE is triggered to register and then the same NAS transport and NAS security can be used. The SMS over NAS is secured by encrypting the SMS message part using an encryption key such as an NAS encryption key. The NAS message is integrity protected using an integrity key such as an NAS integrity key. If multiple NAS instances are active between the UE and the network (AMF), the security context associated with the chosen NAS link is used to partially cipher the SMS message content and integrity protect the whole NAS message.

Once the registration procedure for SMS over NAS (e.g., the registration procedure illustrated in the method 300 shown in FIG. 3) is completed, UE can send or receive SMS using the baseline procedure "MO SMS over NAS in CM-IDLE (baseline)" described under 4.13.3.3 of 3GPP TS 23.502 or the optimized procedure "MO SMS using one step approach in CM-IDLE" described under 4.13.3.4 of 3GPP TS 23.502. When the UE is in connected mode CM-CONNECTED, the UE may send or receive SMS via either 3GPP transport or via untrusted 3GPP access. The secure SMS over NAS procedures can be applied across 3GPP and non-3GPP access.

At successful completion of the registration procedure, the AMF has the address of the SMSF in the NAS context of the UE. Once registered, the UE is able to send and receive SMS over NAS either in CM-CONNECTED or in CM-IDLE states. The SMS packet data unit (PDU) is encrypted using an encryption key such as the 5G NAS ciphering key, KNAS enc, as specified in clause 8.2 of 3GPP TS 33.401, which is incorporated herein by reference in its entirety. The whole NAS message is integrity protected using an integrity key such as the 5G NAS integrity key, KNAS int, as specified in clause 8.1 of TS 33.401. If there are multiple NAS connections active between the UE and AMF, any one of the links could be used to transport the SMS and protect the data using the keys for the selected NAS link. It is assumed here the key selection inherently goes along with the chosen link.

If the UE is in CM-IDLE state, the UE is able to send mobile originated SMS over NAS in one step, protected as mentioned above. To receive mobile terminated SMS over NAS in this state, UE is paged to make the UE connect to the network. Both in the CM-CONNECTED and CM-IDLE states UE need to be registered with SMSF to send and receive SMS messages.

Figure 7:
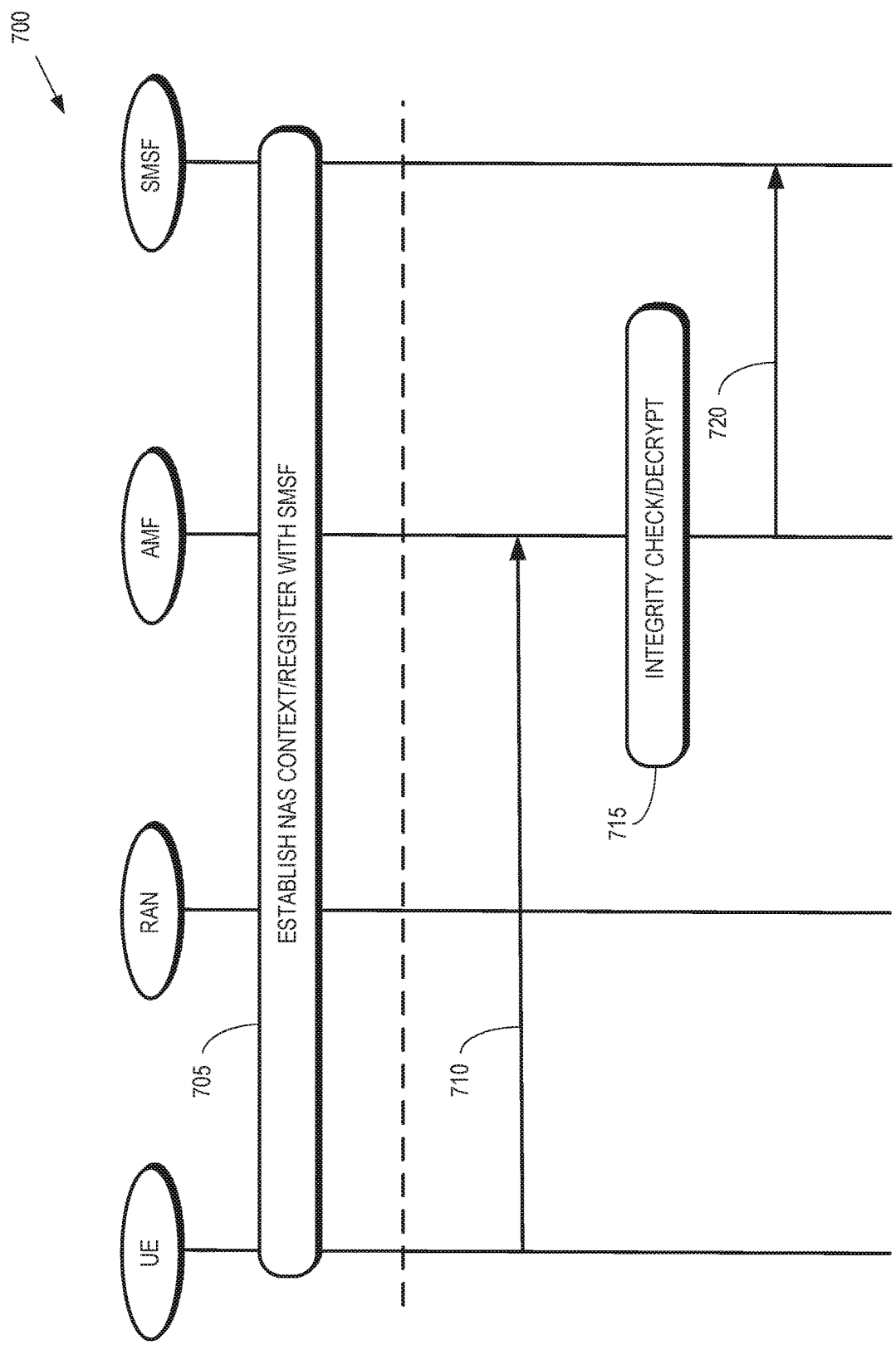
FIG. 7 is a message flow for a security procedure for providing mobile-originated SMS messages over NAS according to some embodiments.

FIG. 7 is a message flow 700 for a security procedure for providing mobile-originated SMS messages over NAS according to some embodiments. The message flow 700 is implemented in some embodiments of the communication system 100 shown in FIG. 1 and the communication system 500 shown in FIG. 5.

At block 705, a UE establishes an NAS context and registers with an SMSF to receive SMS services via a radio access network (RAN). An AMF has the address of the SMSF in the NAS context for the UE. In some embodiments, a one-step procedure can be performed in which the SMSF and the UE keep the registration and thus the AMF retrieves the SMSF address from the UE NAS context. In some embodiments, a generic SMS over NAS procedure is performed in which the AMF accesses the SMSF address in the UE context prior to sending or receiving the SMS message. The NAS context in the UE and the AMF determines whether the one-step procedure or the generic procedure is performed.

At step 710, a mobile-originated SMS message is generated at the UE. The UE sends the NAS message containing the SMS PDU. The SMS PDU is encrypted using an encryption key such as the 5G NAS encryption key, e.g. similar to KNAS enc as specified in clause 8.2 of TS 33.401. The NAS message is integrity protected using an integrity key such as the 5G NAS integrity key, e.g. similar to KNAS int as specified in clause 8.1 of TS 33.401. After AMF has checked the integrity of the NAS message, the SMS PDU is retrieved by using the encryption key to decrypt the SMS PDU at block 715. At step 720, the AMF forwards the SMS PDU to the SMSF if the NAS integrity verification succeeds, e.g., if the integrity check verifies integrity of the NAS message and the SMS PDU is successfully decrypted.

Figure 8:
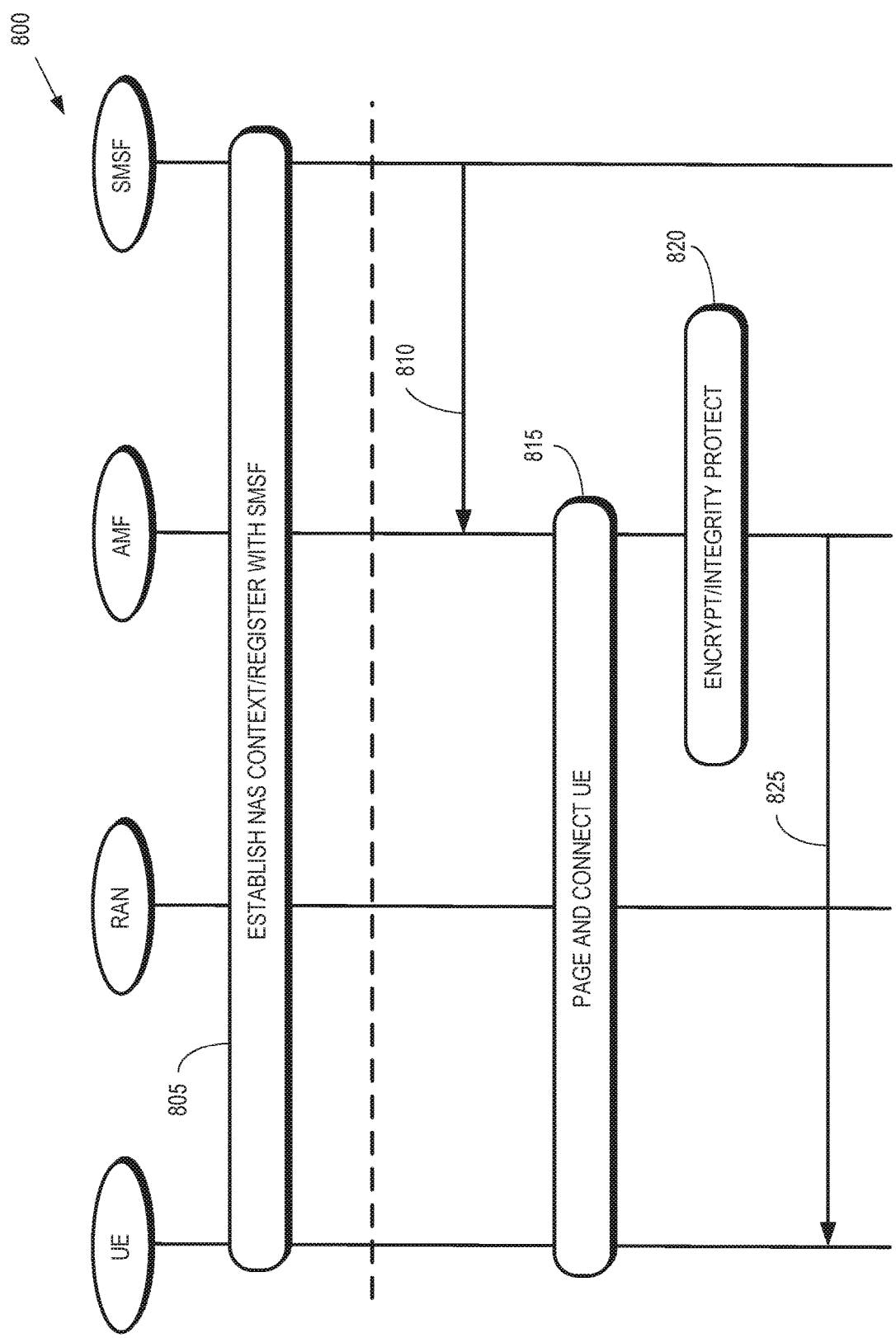
FIG. 8 is a message flow for a security procedure for providing mobile-terminated SMS messages over NAS according to some embodiments.

FIG. 8 is a message flow 800 for a security procedure for providing mobile-terminated SMS messages over NAS according to some embodiments. The message flow 800 is implemented in some embodiments of the communication system 100 shown in FIG. 1 and the communication system 500 shown in FIG. 5.

At block 805, a UE establishes an NAS context and registers with SMSF to receive SMS services. An AMF has the address of the SMSF in the UE NAS context. In some embodiments, a one-step procedure is performed in which the SMSF and the UE keep the registration and thus the AMF retrieves the SMSF address from the UE NAS context. In some embodiments, a generic SMS over NAS procedure is performed in which the AMF accesses the SMSF address in the UE context prior to sending or receiving the SMS message. The NAS context in the UE and the AMF determines whether the generic procedure or the one-step procedure is performed.

At step 810, the SMSF provides an SMS message containing an SMS PDU to the AMF. The SMS message is addressed to the UE. In response to receiving the SMS message, the AMF determines the connection mode of the UE, e.g., the AMF determines whether the UE is in a connected mode (CM-CONNECTED) or an idle mode (CM-IDLE).

If the UE is in CM-IDLE, AMF initiates paging the UE (at block 815) to make the UE connect to the network. If the UE is already in CM-CONNECTED, paging of the UE at block 815 is bypassed and the message flow 800 flows directly from step 810 to block 820.

At block 820, the AMF encrypts the SMS PDU using an encryption key and performs integrity protection on the NAS message including the encrypted SMS PDU using an integrity key. For example, the AMF has the NAS context for the recipient UE available and can encrypt the SMS PDU using an encryption key such as the 5G NAS encryption key, e.g. similar to KNAS enc as specified in clause 8.2 of TS 33.401. The AMF subsequently uses an integrity key such as the 5G NAS integrity key, e.g. similar to KNAS int as specified in clause 8.1 of TS 33.401, to form an integrity-protected NAS message to be sent to the UE. At step 825, the AMF forwards the integrity-protected NAS message including the encrypted SMS PDU to the UE, which verifies the correctness of the message using a local copy of the integrity key and retrieves the SMS PDU by using decryption based on a local copy of the encryption key.

Embodiments of the techniques disclosed herein use NAS security to do partial ciphering of SMS messages that are carried over NAS transport and apply integrity protection to the NAS message. The secure SMS over NAS technique can be used in standardized procedures such as "MO SMS over NAS in CM-IDLE (baseline)," "MO SMS using one step approach in CM-IDLE," "MO SMS over NAS in CM-CONNECTED," "MT SMS over NAS in CM-IDLE via 3GPP access," "MT SMS over NAS in CM-CONNECTED," and "MT SMS over NAS via non 3GPP access."

Figure 9:
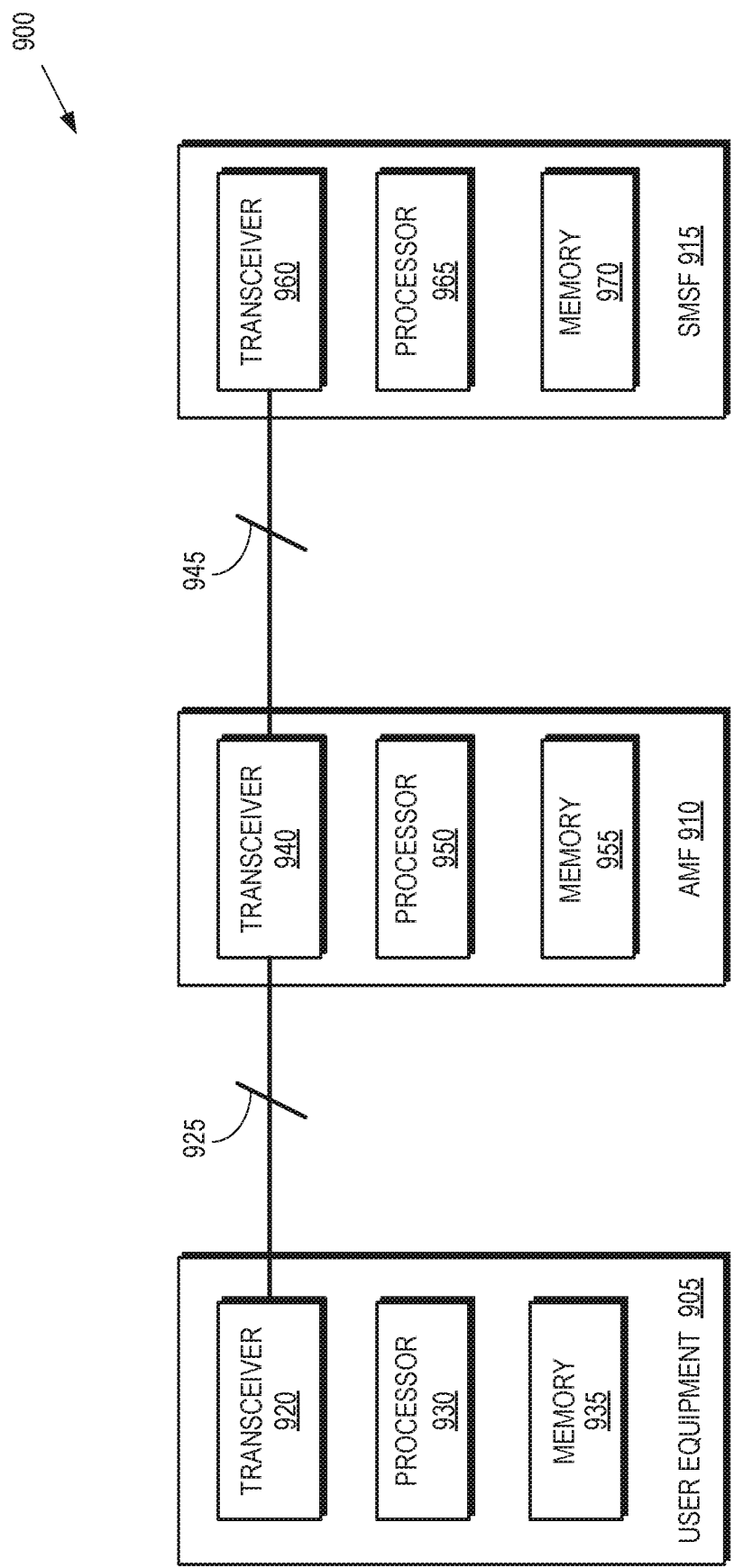
FIG. 9 is a block diagram of a second example of a communication system that supports secure SMS messaging over NAS according to some embodiments.

FIG. 9 is a block diagram of a second example of a communication system 900 that supports secure SMS messaging over NAS according to some embodiments. The communication system 900 includes a user equipment 905, an AMF 910, and an SMSF 915. The communication system 900 can therefore be implemented in some embodiments of the communication system 100 shown in FIG. 1 and the communication system 500 shown in FIG. 5.

The user equipment 905 includes a transceiver 920 for transmitting and receiving signals over an interface 915 with the AMF 910. The user equipment 905 also includes a processor 930 and a memory 935. The processor 930 can be used to execute instructions stored in the memory 935 and to store information in the memory 935 such as the results of the executed instructions. The memory 935 can also be configured to store NAS contexts such as the NAS context 600 shown in FIG. 6. The transceiver 920, the processor 930, and the memory 935 can be configured to perform some embodiments of the message flow 300 shown in FIG. 3, the process 400 shown in FIG. 4, the message flow 700 shown in FIG. 7, and the message flow 800 shown in FIG. 8.

The AMF 910 includes a transceiver 940 for transmitting and receiving signals over the interface 915 with the AMF 910 and over an interface 945 with the SMSF 915. The AMF 910 also includes a processor 950 and a memory 955. The processor 950 can be used to execute instructions stored in the memory 955 and to store information in the memory 955 such as the results of the executed instructions. The memory 955 can also be configured to store NAS contexts such as the NAS context 600 shown in FIG. 6. The transceiver 940, the processor 940, and the memory 945 can be configured to perform some embodiments of the message flow 300 shown in FIG. 3, the process 400 shown in FIG. 4, the message flow 700 shown in FIG. 7, and the message flow 800 shown in FIG. 8.

The SMSF 915 includes a transceiver 960 for transmitting and receiving signals over the interface 945 with the AMF 910. The SMSF 915 also includes a processor 965 and a memory 970. The processor 965 can be used to execute instructions stored in the memory 970 and to store information in the memory 970 such as the results of the executed instructions. The transceiver 960, the processor 965, and the memory 970 can be configured to perform some embodiments of the message flow 300 shown in FIG. 3, the message flow 700 shown in FIG. 7, and the message flow 800 shown in FIG. 8.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A user equipment comprising:
   a memory configured to store a first non-access stratum (NAS) context comprising an address of the user equipment, a plurality of encryption keys, and a plurality of integrity keys, wherein the plurality of encryption keys and the plurality of integrity keys are associated with a plurality of NAS links between the user equipment and an access and mobility management function (AMF) that stores a second NAS context comprising the plurality of encryption keys and the plurality of integrity keys; and
   a processor configured to encrypt an SMS message based on the first NAS context, generate an NAS message including the encrypted SMS message, and apply integrity protection to the NAS message based on the first NAS context.

2. The user equipment of claim 1, further comprising:
   a transmitter configured to transmit the NAS message over a first NAS link selected from the plurality of NAS links between the user equipment and the AMF.

3. The user equipment of claim 2, wherein the processor is configured to select a first encryption key from the plurality of encryption keys and a first integrity key from the plurality of integrity keys, and where in the first encryption key and the first integrity key correspond to the first NAS link.

4. The user equipment of claim 3, wherein the processor is configured to encrypt the SMS message using the first encryption key and add the encrypted SMS message to a payload of the NAS message that includes an NAS header.

5. The user equipment of claim 4, wherein the processor is configured to apply integrity protection to the NAS message using the first integrity key.

6. The user equipment of claim 5, wherein the processor is configured to generate the first NAS context in response to the user equipment registering with the AMF.

7. The user equipment of claim 1, wherein the plurality of NAS links comprise at least one of a fixed NAS link, a mobile NAS link, and a non-Third Generation Partnership Project (non-3GPP) NAS link.

8. A user equipment comprising:
   a memory configured to store a first non-access stratum (NAS) context comprising an address of the user equipment, a plurality of encryption keys, and a plurality of integrity keys, wherein the plurality of encryption keys and the plurality of integrity keys are associated with a plurality of NAS links between the user equipment and an access and mobility management function (AMF) that stores a second NAS context comprising the plurality of encryption keys and the plurality of integrity keys; and
   a processor configured to verify the integrity of an NAS message based on the first context and decrypt an SMS message included in the NAS message based on the first NAS context.

9. The user equipment of claim 8, further comprising:
   a receiver configured to receive the NAS message over a first NAS link selected from the plurality of NAS links between the user equipment and the AMF.

10. The user equipment of claim 9, wherein the processor is configured to select a first encryption key from the plurality of encryption keys and a first integrity key from the plurality of integrity keys, and where in the first encryption key and the first integrity key correspond to the first NAS link.

11. The user equipment of claim 10, wherein the processor is configured to decrypt the SMS message using the first encryption key.

12. The user equipment of claim 11, wherein the processor is configured to verify the integrity of the NAS message using the first integrity key.

13. The user equipment of claim 12, wherein the processor is configured to generate the first NAS context in response to the user equipment registering with the AMF.

14. The user equipment of claim 8, wherein the plurality of NAS links comprise at least one of a fixed NAS link, a mobile NAS link, and a non-Third Generation Partnership Project (non-3GPP) NAS link.

15. A user equipment comprising:
   a memory configured to store a first non-access stratum (NAS) context comprising an address of the user equipment, a plurality of encryption keys, and a plurality of integrity keys, wherein the plurality of encryption keys and the plurality of integrity keys are associated with a plurality of NAS links between the user equipment and an access and mobility management function (AMF) that stores a second NAS context comprising the plurality of encryption keys and the plurality of integrity keys;
   a transceiver configured to transmit a mobile-originated NAS message and receive a mobile-terminated SAS message; and
   a processor configured to:
      generate the mobile-originated NAS message by encrypting a mobile-originated SMS message based on the first NAS context, adding the encrypted mobile-originated SMS message to the mobile-originated NAS message, and applying integrity protection to the mobile-originated NAS message based on the first NAS context, and
      process the mobile-terminated NAS message by verifying the integrity of the mobile-terminated NAS message based on the first NAS context and decrypting a mobile-terminated SMS message included in the mobile-terminated NAS message based on the first NAS context.

16. The user equipment of claim 15, wherein the processor is configured to select a first encryption key from the plurality of encryption keys and a first integrity key from the plurality of integrity keys, and where in the first encryption key and the first integrity key correspond to the first NAS link.

17. The user equipment of claim 16, wherein the processor is configured to encrypt the mobile-originated SMS message using the first encryption key and add the encrypted mobile-originated SMS message to a payload of the mobile-originated NAS message that includes an NAS header.

18. The user equipment of claim 17, wherein the processor is configured to apply integrity protection to the mobile-originated NAS message using the first integrity key.

19. The user equipment of claim 16, wherein the processor is configured to decrypt the mobile-terminated SMS message using the first encryption key.

20. The user equipment of claim 19, wherein the processor is configured to verify the integrity of the mobile-terminated NAS message using the first integrity key.

21. The user equipment of claim 16, wherein the processor is configured to generate the first NAS context in response to the user equipment registering with the AMF.

22. The user equipment of claim 15, wherein the plurality of NAS links comprise at least one of a fixed NAS link, a mobile NAS link, and a non-Third Generation Partnership Project (non-3GPP) NAS link.

* * * * *